United States Patent [19]

Evert et al.

[11] 4,116,401
[45] Sep. 26, 1978

[54] DUAL REEL HUB

[75] Inventors: Donald A. Evert, Littleton, Colo.; Charles W. Nies, deceased, late of Littleton, Colo., by Carolyn J. Nies, executrix

[73] Assignee: Honeywell Inc., Minneapolis, Minn.

[21] Appl. No.: 796,528

[22] Filed: May 13, 1977

[51] Int. Cl.$^2$ .......................... G03B 1/04; B65H 17/02
[52] U.S. Cl. .................................... 242/68.3; 242/193
[58] Field of Search .................... 242/68.3, 68.1, 68.2, 242/193, 194; 352/156

[56] References Cited

U.S. PATENT DOCUMENTS

| | | | |
|---|---|---|---|
| 3,322,364 | 5/1967 | Dekker | 242/68.3 |
| 3,322,365 | 5/1967 | Martin et al. | 242/68.3 |
| 3,561,699 | 2/1971 | Garrett et al. | 242/193 |

*Primary Examiner*—Harvey C. Hornsby
*Assistant Examiner*—John M. Jillions
*Attorney, Agent, or Firm*—Laurence J. Marhoefer; Lockwood D. Burton; Mitchell J. Halista

[57] ABSTRACT

A dual reel hub assembly for coaxially mounting two independently rotatable confronting reels on an axially inward hub structure and an axially outward hub structure, respectively. The inward and outward hub structures are mounted on a common central spindle with the inward hub structure being freely rotatable while the outward hub structure is fixedly attached to the spindle and spaced from the inward hub structure. Each hub structure includes a reel support shell for supporting an inner surface of an axial opening in a reel. A plurality of radially outwardly extending key pins are aligned parallel to the spindle axis on each reel support shell to mate with one of a plurality of keyways on the inner surface of the axial reel opening. A rotatable locking ring on each hub structure is dimensioned to pass through the axial reel opening and has radially outwardly projecting locking fingers dimensioned to pass through the keyways and equal in number thereto. On the inner hub structure, the locking ring is spring biased toward a circumferential flange located at the opposite end of the hub shell from the locking ring. On the outer hub, the locking ring is spring biased toward a flange segment plate dimensioned to pass through the reel axial opening and having radially outwardly extending flange segments dimensioned to pass through the keyways and equal in number thereto. An actuator assembly in the outer hub selectively connects the inner and outer hub structures to enable the locking rings and flange plate to be positioned either aligned with the keyways or against respective reel faces.

12 Claims, 10 Drawing Figures

FIG. 3
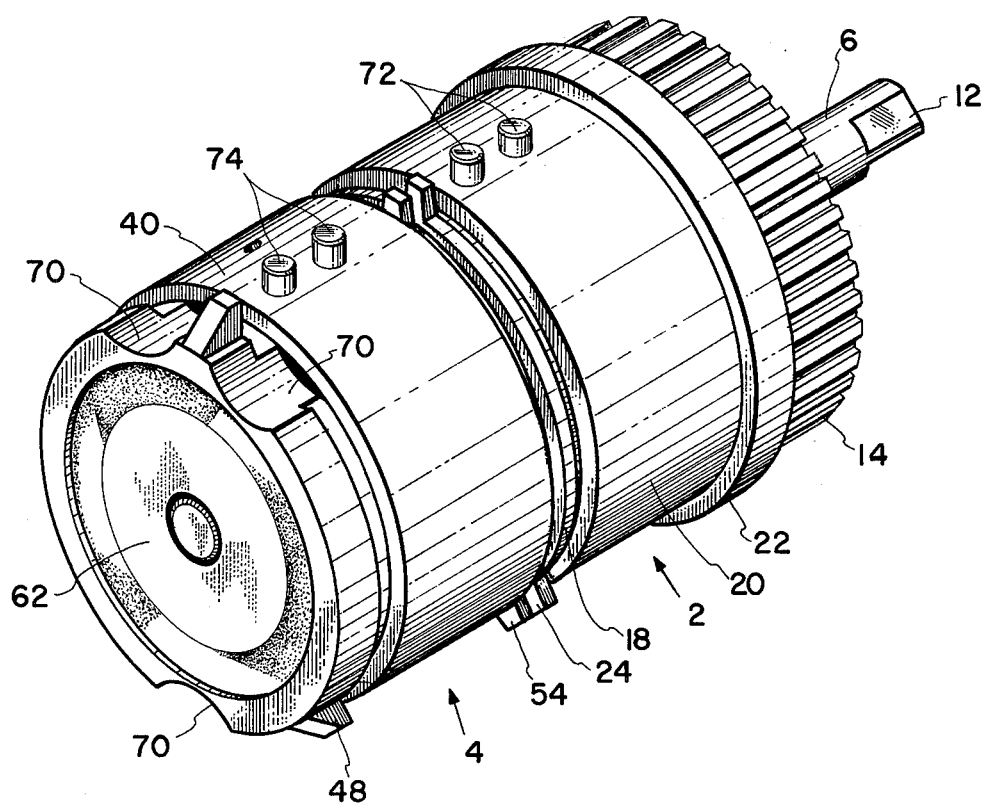
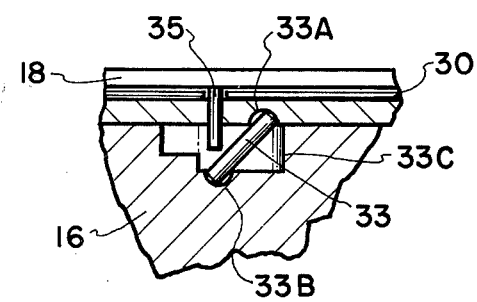
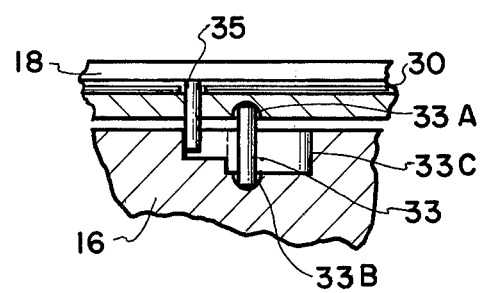
FIG. 4
FIG. 5

DUAL REEL HUB

BACKGROUND OF THE INVENTION

1. Field Of The Invention

The present invention relates to tape transports. More particularly, the present invention is directed to a tape reel hub assembly for mounting a pair of tape storage reels in coaxial alignment while allowing separate rotation thereof.

2. Description Of The Prior Art

While in a conventional data processing apparatus, including a tape supply reel and a tape takeup reel, the reels are usually located in the same plane and are rotatably mounted on individual shafts including tape reel hubs having means for locking the reels thereon, such an arrangement requires a considerable surface area in order to mount the reels on the associated tape transport apparatus. Accordingly, in order to improve the compactness of the tape transport, a dual reel hub having the tape reels mounted coaxially while allowing the independent operation thereof would improve the compactness of the tape transport apparatus while decreasing the overall cost thereof by eliminating one reel hub and its mounting. Prior art attempts to provide such a dual reel hub structure are well-known, e.g., U.S. Pat. Nos. 3,684,208; 3,417,387; 3,322,365; and 3,294,334. These prior art structures while providing a mounting hub for coaxially supporting dual tape reels have usually had a number of inherent shortcomings either in the area of providing for an easy mounting and dismounting of the tape reels or providing for a rigid and secure locking of the mounted tape reels to the reel hub during a tape reel driving operation. Accordingly, it is desirable to provide an improved dual reel hub having an improved structure for easily mounting and dismounting tape reels thereon while affording a secure locking of the mounted tape reels to the reel hub.

SUMMARY OF THE INVENTION

An object of the present invention is to provide an improved dual reel hub for coaxially mounting a pair of tape reels while affording independent operation thereof.

Another object of the present invention is to provide an improved dual reel hub for easily mounting and dismounting a pair of coaxial tape reels thereon while securely locking mounted tape reels to the hub.

In accomplishing these and other objects, there has been provided, in accordance with the present invention, a dual reel hub having an inner and an outer hub structure which are independently supported on a central shaft to afford an independent rotational operation thereof. The inner and outer hub structures are selectively alignable and operatively interconnectable to selectively afford a mounting and dismounting operation of the inner and outer tape reels mounted thereon. Each hub structure includes a flange means for supporting a reel, a reel locking means for retaining a reel against the flange means and a spring means for urging the reel locking means toward the flange means.

BRIEF DESCRIPTION OF THE DRAWINGS

A better understanding of the present invention may be had when the following detailed description is read in connection with the accompanying drawings, in which:

FIG. 3 is an isometric view of the outside of the dual reel hub of the present invention in a reel mounting and dismounting position, FIG. 4 is a cross-sectional view of a first position of a portion of the dual reel hub shown in FIGS. 1 to 3, FIG. 5 is a cross-sectional view of a second position of the portion of the dual reel hub shown in FIG. 4.

DESCRIPTION OF THE PREFERRED EMBODIMENT

Figure 1:
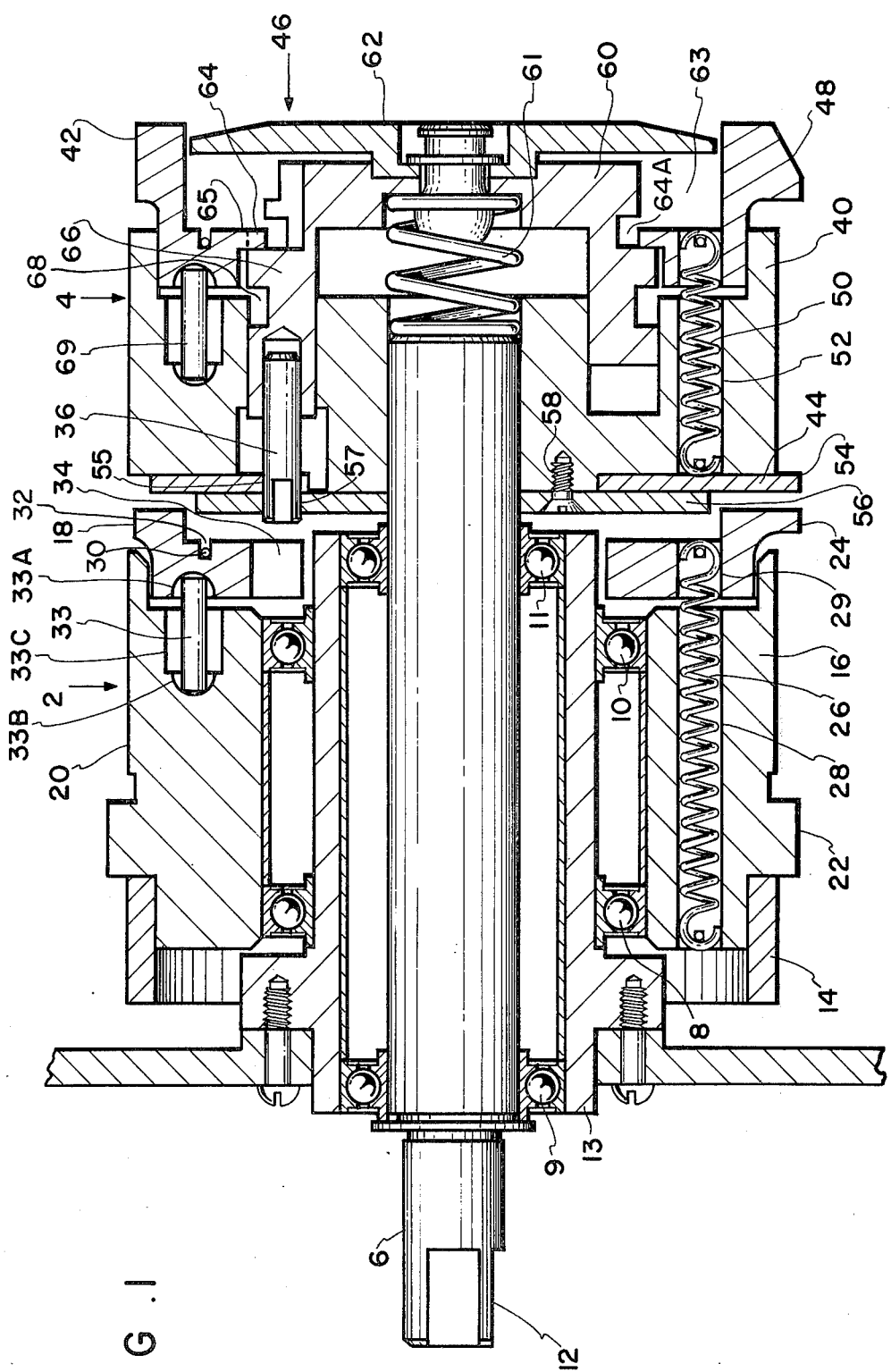
FIG. 1 is a cross-sectional view of a dual reel hub embodying the present invention.

Referring to FIG. 1 in more detail, there is shown a cross-sectional view of a dual reel hub embodying the present invention and having a reel supportive inner hub structure 2 and a reel supportive outer hub structure 4 mounted in axial alignment on a common center shaft 6. The outer hub structure is fixedly connected by any suitable means, e.g., set-screws (not shown), to one end of the center shaft 6 for rotation therewith. The inner hub structure 2, on the other hand, is mounted on bearings 8 and 10 which, in turn, are mounted on a center sleeve 13 having a flanged end for mounting the dual reel hub on a tape transport apparatus. The sleeve is mounted on bearings 9, 11 which, in turn, are mounted on the center shaft 6. This configuration allows the inner hub structure 2 and the outer hub structure 4 to rotate independently thereon and to position the inner hub structure 2 adjacent to the outer hub structure 4.

The other end of the center shaft 6 is arranged to project past the inner hub structure 2 and the sleeve 13 and is terminated in a configured end 12 for connecting the shaft 6 to a shaft drive means (not shown). One end of the inner hub structure 2, e.g., the end nearest the projecting end 12 of the center shaft 6, is provided with a peripherally attached element suitable for connecting the inner hub structure 2 to a drive means (not shown). For example, a pulley ring 14 having an external surface provided with a series of evenly spaced peripheral grooves defining truncated gear teeth can be fixedly mounted on the external surface of the inner hub structure 2 to accept a toothed belt (not shown) for driving the inner hub structure 2. The separate hub drives for the inner and outer hub structures 2, 4 would enable them to function separately, e.g., as supply reel and take-up reel hub structures, respectively.

Figure 6:
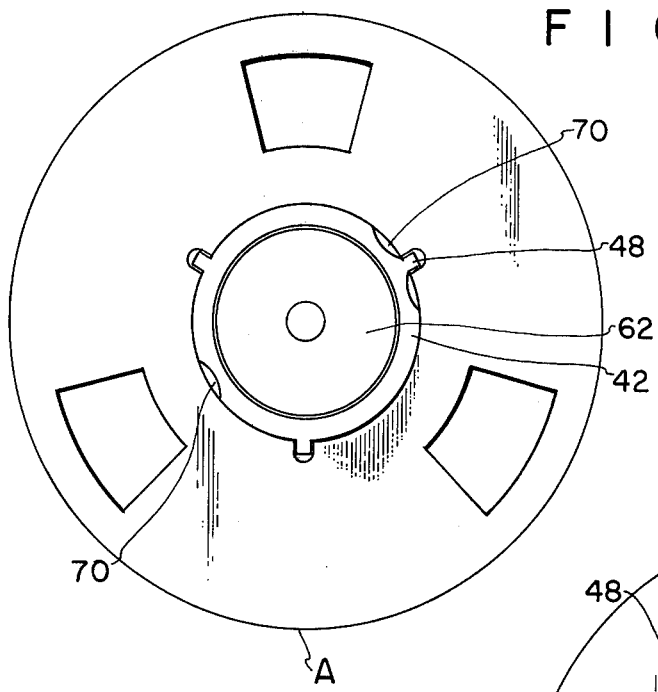
FIG. 6 is an end view of the dual reel hub of the present invention in an unlocked state with tape reels mounted thereon.
Figure 7:
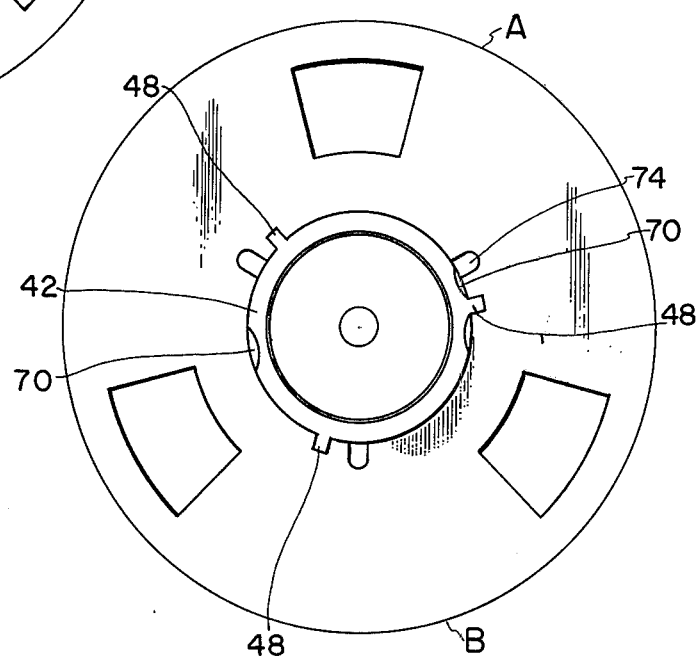
FIG. 7 is an end view of the dual reel hub of the present invention in a locked state to retain the tape reels mounted thereon.

The inner hub structure 2 is divided into two axially aligned elements, i.e., a hub shell 16 and a reel locking ring 18. The hub shell 16 is mounted on the aforesaid bearings 8, and 10 and has an outer circumferential surface 20 dimensioned to mate with an inner surface of a tape reel axial circular opening for supporting a tape reel thereon, as shown in FIGS. 6 and 7. Additionally, a radially outwardly extending peripheral flange 22 is located at the end of the inner hub shell 20 adjacent to the pulley ring 14. The flange 22 acts as a stop and as a further support for the tape reel mounted on the inner hub structure 2 since the hub outer surface 20 is dimensioned to pass through the circular axial opening in a reel while the flange 22 extends past this reel axial opening to contact a reel face.

The locking ring 18 is also generally dimensioned to pass through the axial opening of a tape reel and has three radially outwardly extending locking fingers 24 evenly spaced on the periphery of the locking ring 18. The locking fingers 24 are dimensioned to pass through corresponding ones of the three longitudinal grooves, or keyways, conventionally located on the inner circumferential surface of the axial opening of a tape reel. The locking fingers 24, however, project past the outer hub surface 20 and past the reel axial opening and are selectively positionable between a first and a second position by a rotation of the locking ring 18. The locking ring 18 is biased toward the flange 22 by three springs 26 located in corresponding ones of three longitudinal bores 28 evenly spaced in the hub shell 16 and passing through the hub shell 16. Further, the springs 26 extend through corresponding ones of three evenly spaced holes 29 in the locking ring 18. The springs 26 are each attached at one end to the locking ring 18 by any suitable means, e.g., a locking wire 30 located in an annular groove 32 on the other side of locking ring 18 from the hub shell 16 and arranged to pass through an eye of each of the springs 26. The other end of each of the springs 26 is attached to the end of the hub shell 16 adjacent to the pulley ring 14 by a similar means. The holes 29 in the locking ring 18 for accommodating the springs 26 are slotted to allow a limited rotation of the locking ring 18 between the aforesaid first and second positions with concurrent movement of the eyes of the springs 26 on the locking wire 30.

The locking ring 18 is separated from the hub shell 16 by a plurality, e.g., three, evenly spaced spacer pins 33. The pins 33 each have rounded ends and are each arranged to extend between a respective hemispherical depression 33A in the locking ring 18 and a similar depression 33B in the hub shell 16. The hub shell depressions 33B are each located at the bottom of a respective slotted well 33C which permits a sideways, or tilting, movement of the pins 33 from a position wherein they are perpendicular to the locking ring 18 and the hub shell 16. The pins 33 are each free to rotate on their rounded ends in their respective depressions 33A and 33B to effect the aforesaid change in position in response to a rotational movement of the locking ring 18 with respect to the hub shell 16. The tilting of the pins 33 decreases the distance between the locking ring and the flange 22 since the locking ring 18 is urged toward the flange 22 by the springs 26. The angle of rotation of the locking ring 18 is limited, or fixed, by the length of the slots 29 encompassing one end of the springs 26 and by a stop pin 35 shown in FIGS. 3 and 4 and discussed hereinafter. The locking ring 18 is also provided with a plurality, e.g., three, inner radial slots 34 dimensioned to accept a free end of a control pin 36. The control pin 36 is carried by the outer reel structure 4 and is selectively moveable between a first position wherein the free end thereof is withdrawn from the slot 34 and a second position wherein the free end of the control pin 36 engages, as described hereinafter, the slot 34.

The outer hub structure 4 is divided into four major axially aligned components. These are an outer hub shell 40, also dimensioned to mate with an inner circumferential surface of an axial reel opening, a locking ring 42, a flange segment plate 44 and an actuator 46. The locking ring 42 of the outer hub structure 4 is generally dimensioned to pass through the central opening of a tape reel and also has three radially outwardly extending locking fingers 48 equally spaced around its outer periphery. The locking fingers 48 are dimensioned similarly to the locking fingers 24 to pass through the longitudinal grooves on the axial opening surface of a reel while projecting past the outer surface of the outer hub shell 40 and the axial opening of the tape reel, as shown in FIGS. 6 and 7. The locking ring 42 is biased toward the outer hub shell 40 by three springs 50 located in respective bores 52 equally spaced in the outer hub shell 40. The ends of the springs 50 are retained on the locking ring 42 and the distant end of the hub shell 40, respectively, in a manner similar to that described above for the springs 26.

The flange segment plate 44 is located at the other end of the outer hub shell 40 from the locking ring 42. The flange segment plate 44 generally conforms to the outer diameter of the outer hub shell 40 to pass through the central opening of a reel. The flange segment plate 44 has three radially outwardly extending flange segments 54 dimensioned to pass through the longitudinal grooves in the reel axial opening while projecting past the outer surface of the outer hub shell 40 and the axial opening of the tape reel. The flange segment plate 44 is provided with a center axial opening to encircle the end of the outer hub shell 40 and is retained thereon by a partially overlying retaining plate 56 attached to the end of the outer hub shell 40 by a plurality of attaching screws 58. The retaining plate 56 has a smaller diameter than the segment plate 44 and is arranged to lightly grip the segment plate 44 to allow the segment plate 44 to rotate, or slide, between the support plate 56 and the end of the outer hub shell 40. The aforesaid free end of the control pin 36 is arranged to project through a hole 55 in the flange plate 44 and a slot 57 in the support plate 56.

The outer hub structure 4 is mounted on the end of the shaft 6 by any suitable means (not shown) and is axially spaced from the inner hub structure 2 on the shaft 6 to provide clearance between the flange plate 54, the support plate 56 and the free end of the control pin 36 in its first position and the adjacent components of the inner hub structure 2.

Figure 10:
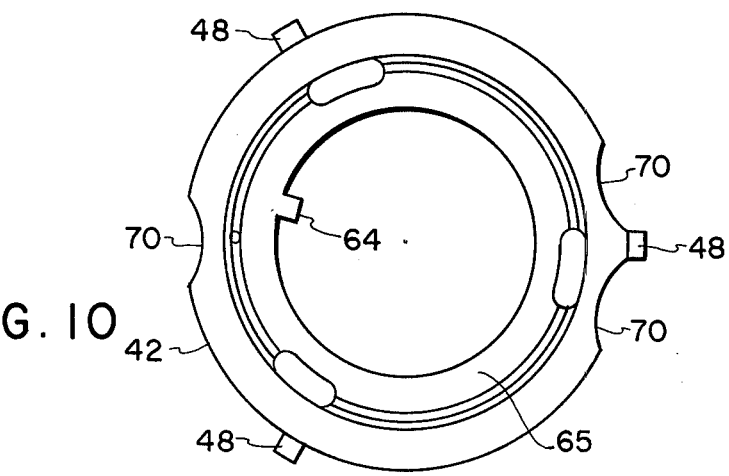
FIG. 10 is a top view of the outer hub locking ring of the dual reel hub of the present invention.

The actuator 46 includes two major parts, i.e., an inner cylinder and an outer push plate. An inner cylindrical shell having a closed end forms a cap 60 which is arranged to telescope into the outer hub shell 40. The cap 60 is spring biased away from the end of the shaft 6 by an internal spring 61 located between the end of the shaft 6 and an interior surface of the closed end of the cap 60. A push plate 62 is axially aligned and centrally attached to the closed end of the cap 60 on the outer side from the spring 62. The periphery of the push plate 62 extends past the side of the cap 60 to cover a central circular recess 63 in the outer hub locking ring 42. As shown in FIG. 10, the locking ring 42 has a single radially inwardly extending locking tab 64 on an inwardly extending annular lip 65 of the central recess 63 of the locking ring 42.

Figure 8:
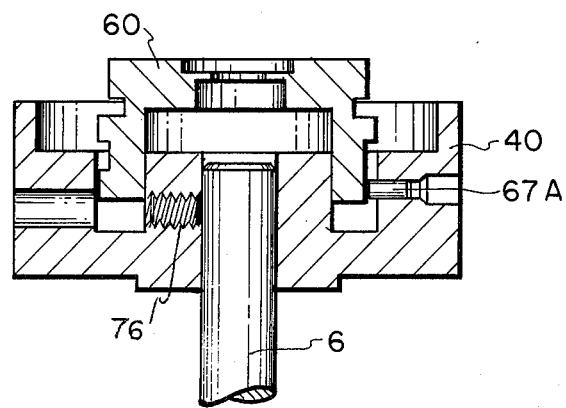
FIG. 8 is a detailed cross-sectional view of a portion of the dual reel hub of the present invention.
Figure 9:
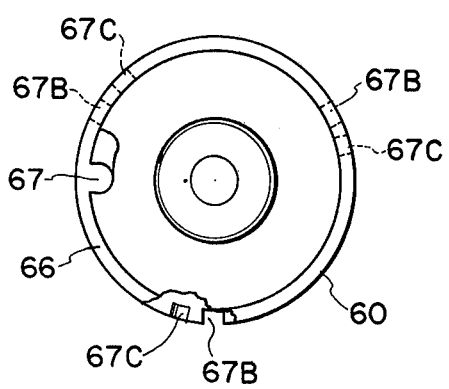
FIG. 9 is a top view of a portion of the outer hub structure of the present invention.

The annular lip 65 is arranged to overlie a portion of the ledge 66 to act as an outermost position stop for the cap 60. The cap 60 is provided with a first peripheral groove 64A, as shown in FIG. 9, into which the tab 64 extends to engage the cap 60. A longitudinal slot 67 is located on the cap 60 beneath the push plate 62 and communicating with the first peripheral groove 64A. The slot 67 is dimensioned to allow the tab 64 to pass through the slot 67. Thus, when the tab 64 is aligned with the slot 67 by a rotation of the locking ring 42, the push plate 62 and cap 60 can be manually telescoped into the hub shell 40 by overcoming the resistance of the spring 61. When the tab 64 is not aligned with the slot 67, the push plate 62 and cap 60 are prevented from being telescoped into the shell 40 by the tab 64 contacting a wall of the groove 64A and are retained in an outermost state by the spring 61. The shell 40 has a plurality, e.g., three, of coplanar locking pins 67A extending radially inwardly and evenly spaced on the hub shell 40, as shown in FIG. 8. Each of the locking pins 67A interferes with the free end of the cap 60, i.e., the end of the cap 60 within the shell 40, except in the area of a longitudinal respective slot 67B, shown in FIG. 9, located in the ledge 66 to allow the locking pins 67A to enter a second peripheral groove 68 in the cap 60 located adjacent to the first groove 64A. Further, the groove wall of the ledge 66 adjacent to the slots 67B has a plurality of pin grooves 67C circumferentially displaced, e.g., 15°, from the slots 67 with each groove 67A being operationally related to a respective one of the slots 67. Thus, when a locking pin 67A enters the peripheral groove 68 through the slot 67B, a rotation of the cap 60 positions the pins 67A in respective ones of the pin grooves 67C. Thus, the locking pins 67A prevent a telescoping motion of the cap 60 except when the slots 67B are each aligned with their respective locking pins 67A. Further, if the cap 60 is rotated while the locking pins 67A are in the groove 68, the cap 60 will be retained in a telescoped state and the locking pins 67A are located in the pin grooves 67C.

Figure 2:
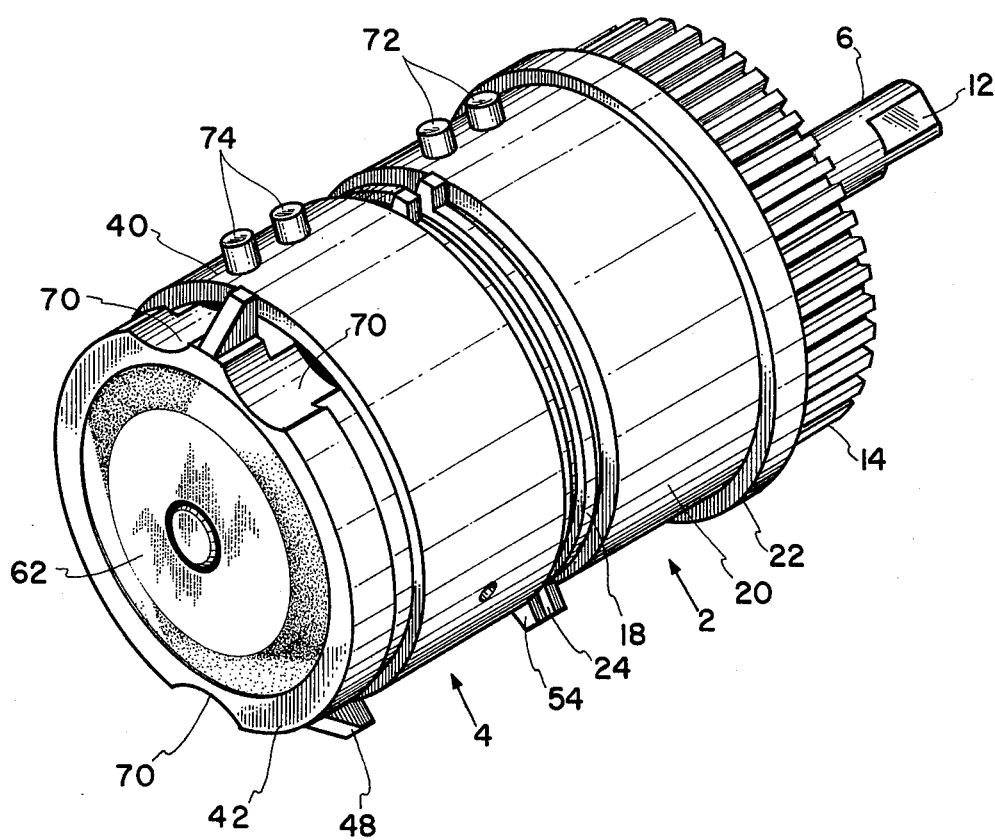
FIG. 2 is an isometric view of the outside of the dual reel hub of the present invention in a reel retaining position.

A cylindrical side wall of the cap 60 is arranged to retain the other end of the control pin 36 in an orientation parallel to the axis of the shaft 6 with the free end of the pin 36 in the hole 55 and slot 57, as previously discussed. The locking ring 42 is axially separated from the outer hub shell 40 by a plurality, e.g., three, of evenly spaced spacer pins 69 in a manner similar to the spacer pins 33 used between the locking ring 18 and the inner hub shell 16. Thus, the spacer pins 69 also have rounded ends and cooperate with hemispherical depressions in the locking ring 42 and the outer hub shell 40 to allow the springs to urge the locking ring 42 to approach the adjacent end of the outer hub shell 40 during a tilting of the spacer pins 69 and to separate the locking ring 42 from the hub shell 40 by opposing the springs during a non-tilted position of the spacer pins 69. As shown in FIGS. 2 and 3, the outer locking ring 42 is provided with a plurality of peripheral depressions 70 which are dimensioned to permit engagement thereof by the finger tips of an operator whereby the outer locking ring 42 may be manually rotated between a first and a second position. These positions of the outer locking ring 42 are defined by the movement of the ends of the springs 50 on their retaining wire in the locking ring 42 and the movement of the spacer pins 69. The locking ring 42 is also provided with a stop pin similar to that found on the locking ring 18 and shown in FIGS. 4 and 5 for further limiting the rotational movement of the locking ring 42. The inner and outer hub structures 2 and 4 each have a pair of longitudinal aligned key pins, 72 and 74, respectively, located on the outer surfaces of the hub structures 2 and 4. These key pins 72 and 74 are dimensioned to pass through the reel keyways and are longitudinally aligned along a line parallel to the axis of the shaft 6. The key pins 72 and 74 interact with the reel keyways to prevent rotation of the respective reels mounted on the hub structures 2 and 4 and to assist in applying a rotational force from the hub structures 2 and 4 to the respective mounted reels.

MODE OF OPERATION

In operation, the dual reel hub of the present invention is operative to allow a mounting and dismounting of tape reels on the inner and outer hub structures 2 and 4, respectively, and to locate and hold the mounted inner and outer tape reels on their respective hub structures. In order to prepare the dual reel hub for mounting of a pair of tape reels thereon, one of each of the locking fingers 48 and 24 of the locking rings 24 and 18, respectively, and one of the flange segments 54 of the flange plate 44 must be aligned with the key pins 72, 74 in order to enable these elements to pass through one of the keyways of the central opening in a tape reel. In this position, the other locking fingers and flange segments are automatically located in alignment with the other reel opening keyways. It should also be noted that the key pins 72 and 74 need not be aligned with other but can be displaced by 120° and still be arranged in a reel keyway alignment state wherein one set of key pins, e.g., pins 72, would not be aligned with the same set of locking fingers and flange segments as the other set of key pins, e.g., pins 74.

Assuming these elements are initially out of alignment, e.g., the position shown in FIG. 2, the outer hub shell 40 is held by an operator while the outer locking ring 42 is turned from a misaligned, or first, position to an aligned position with the key pins 74 by engaging the depressions 70 on its outer periphery by an operator's finger tips and rotating the locking ring 42 in a permitted direction. When the locking fingers 48 of the outer locking ring 42 are aligned with the key pins 74 on the outer hub shell 40, the locking ring 42 will have reached its second position wherein the spacer pins 68 are perpendicular to the locking ring 42 and hub shell 40 to provide a maximum separation between the locking ring 42 and the hub shell 40. Additionally, the slot 67 in the cap 60 is arranged to be concurrently aligned in this second position of the locking ring 42 with the locking tab 64 in the locking ring 42 and the locking pins 67A are aligned with the slots 67B. This alignment enables the push plate 62 to be fully depressed telescoping the cap 60 into the hub shell 40, passing the tab 64 through the slot 67 in the cap 60 and the pins 67a through the slots 67B to insert the control pin 36 in the slot 34 of the inner hub structure 2.

While maintaining the push plate 62 in this maximum depressed state, the inner hub structure 2 is grasped by the operator and the outer hub structure 4 is rotated in a direction which is effective to align one of the flange segments 54 with the key pins 74 and one of the previously aligned locking fingers 48 of the outer hub lock ring 42. Thus, the control pin 36 is shifted within the confines of the slotted groove 57 in the retainer plate 56 while moving the flange plate 44. Since this rotation is effective to rotate the cap 60, the locking pins 67A are driven past the slots 67B in the cap 60, and the push plate 62 is retained in a depressed state by the locking pins 67A in the pin grooves 67C in the second groove 68. This depressed, or telescoped, state of the push plate 62 and cap 60 retains the free end of the control pin 36 in the slot 34.

Finally, in this depressed state of the push plate 62, the rotation of the outer hub structure 4 is continued in the same direction while the inner hub structure 2 is retained by the operator in an immobile state. Inasmuch as the actuator pin 36 has reached the end of the slotted groove 55 in the retainer plate 56, this further rotation drives the locking ring 18 of the inner hub structure 2 to align the locking fingers 24 on the inner hub locking ring 18 with the flange segments 54 and the locking fingers 48. Concurrently, one of the locking fingers 24 is aligned with the key pins 72 on the inner hub structure 2. Additionally, the spacer pins 33 are positioned perpendicular to the inner locking ring 18 and the inner hub shell 16 to space the locking ring 18 from the inner hub shell 16. Further, the inner and outer hub structures 2 and 4 are locked to each other in the aligned state by the control pin 36 which is retained in its extended state by the depressed state of the push plate 64 and cap 60.

In this aligned state of the dual reel hub, as shown in FIG. 3, a reel may be mounted on the inner hub structure 2 with the keyways in the central opening of the reel passing over the aligned locking fingers 24, 48, flange segments 54 and key pins 72, 74 as shown in FIG. 6. When the reel is positioned on the inner hub structure 2, the mounted reel is grasped by the operator to immobilize the inner hub structure 2 by a contact between one of the reel keyways and the key pins 72 while the outer hub structure 4 is rotated back by the operator. This reverse rotation repositions the locking fingers 24 cut of alignment with the key pins 72 on the inner hub structure 2 and allows the spacer pins 33 to tilt. In this state, the locking fingers 24 are positioned against the adjacent face of the reel to urge the reel against the flange under control of the springs 26. A further rotation of the outer hub structure 4 repositions the flange segments 54 out of alignment with the outer hub key pins 72. Further, the locking pins 67A are realigned with the slots 67B in the shell 40 and the tab 64 is realigned with the slot 67 in the shell 40 to allow the cap 60 and push plate 64 to return to a non-depressed state under urging of the spring 62.

The outer reel is now mounted on the outer hub structure 4 against the flange segments 54. The outer hub structure is subsequently immobilized by the operator by grasping the mounted outer reel to induce contact between one of the outer reel keyways and the outer hub key pins 74. The outer locking ring 42 is then returned to an initial position by a rotation by the operator which is effectively to misalign the locking fingers 48 with respect to the keyways of the mounted outer reel and to allow the spacer pins 69 to tilt to the position shown in FIG. 4. In this position, the locking fingers 48 are positioned against the adjacent face of the mounted outer reel, as shown in FIG. 7, to urge the reel A against the flange segments 54 under control of the springs 50. Further, the tab 64 is not aligned with the slot 67 to prevent an inadvertent telescoping of the push plate 62 and cap 60 into the shell 40 and an undesired extension of the control pin 36 into the inner hub structure 2. Thus, the inner and outer reels are now operatively attached to the inner and outer reel hub structures 2 and 4, respectively, for independent operation thereby. A dismounting of the reels from the dual reel hub of the present invention is achieved by the alignment procedure discussed above and grasping the tape reels to immobilize the hub structures 2 and 4.

Accordingly, it may be seen that there has been provided, in accordance with the present invention, a dual reel hub for securely coaxially mounting a pair of tape reels while affording a rapid mounting and dismounting of the tape reels thereon.

The embodiments of the invention in which an exclusive property of privilege is claimed are defined as follows:

1. A dual reel hub for mounting an inner reel and an outer reel coaxially with each reel having an axial opening with at least one longitudinal groove on an inner surface thereof comprising
an inner reel hub means dimensioned to pass through the axial opening in a reel and having a fixed outwardly extending circumferential flange means at one end thereof to engage a face of a reel,
a first rotatable locking ring means coaxially positioned on the other end of said reel hub means for said flange means and dimensioned to pass through the axial opening in a reel while having at least one radially outwardly extending locking finger projecting past the axial opening in a reel to engage a face of a reel and dimensioned to pass through the longitudinal groove in the axial opening of a reel,
first spring means connecting said locking ring means to said reel hub means and urging said locking ring means toward said fixed flange means,
center shaft means,
bearing means rotatably mounting said inner reel hub means on said shaft means,
an outer reel hub means dimensioned to pass through the axial opening in a reel,
attaching means for connecting said outer reel hub means to said shaft means for rotation with said shaft means and axially displaced from said inner reel hub means,
a rotatably reel support means coaxially positioned at one end of said outer reel hub means and dimensioned to pass through the axial opening in a reel while having at least one radially outwardly extending flange segment projecting past the axial reel opening to engage a face of a reel and dimensioned to pass through the longitudinal groove in the axial opening in a reel,
a second rotatable locking ring means coaxially positioned on the other end of said outer reel hub means for said reel support means and dimensioned to pass through the axial opening in a reel while having at least one radially outwardly extending reel locking finger projecting past the axial reel opening to engage a face of a reel and dimensioned to pass through the longitudinal groove in the axial opening in a reel,
second spring means connecting said second locking ring means to said outer reel hub means and urging said second locking ring means toward said reel support means, and
actuating means for selectively interconnecting said second locking ring means, said outer reel hub means, said reel support, means and said first locking ring means for aligning said locking fingers on said first and second locking rings with said flange segment on said reel support whereby the longitudinal groove in the axial opening of a reel passes over said aligned locking fingers and said flange segment to permit a mounting and dismounting of reels on said inner and outer reel hub means and for misaligning said locking fingers and said flange segment whereby to assume a position against a respective reel face to retain an inner reel on said inner hub means and an outer reel on said outer hub means.

2. A dual reel hub as set forth in claim 1 wherein said locking fingers of said first and second locking ring means and said flange segment of said support means are each equal in number to the number of the longitudinal grooves located on an inner surface of the axial opening in a reel to be mounted on said dual reel hub.

3. A dual reel hub as set forth in claim 1 wherein said inner and outer reel hub means each includes a plurality of fixed and radially outwardly extending reel locating pins positioned on a longitudinal line extending along an outer surface of said inner and outer reel hub means between said ends of said reel hub means and coplanar with a central axis of said inner and outer reel hub means, said locating pins being arranged to mate with a longitudinal groove on an inner surface of the axial opening in a reel to be located on said dual reel hub.

4. A dual reel hub as set forth in claim 1 wherein said inner reel hub means includes joining means for connecting said inner reel hub means to a driving means for rotating said inner reel hub means on said bearing means.

5. A dual reel hub as set forth in claim 1 wherein said center shaft means includes shaft drive means for extending an end of said center shaft means past said inner and outer reel hub means to provide means for connecting said center shaft means to a means for rotating said center shaft means.

6. A dual reel hub as set forth in claim 1 wherein said actuating means includes a selectively moveable plate coaxially mounted on said outer reel hub means and selectively moveable between a first position and a second position, locking pin means carried by said outer hub means, said locking pin means engaging said inner and outer hub means in said second position and being free of said inner hub means in said first position and spring means connecting said plate to said outer hub means to permit a displacement of said plate between said first and second position while urging said plate to said first position, said plate displacing said locking pin to said second position when said plate is in said second position.

7. A dual reel hub as set forth in claim 2 wherein said locking fingers of said first and second looking ring means and said flange segment of said support means are each three in number.

8. A dual reel hub as set forth in claim 1 wherein said inner hub means includes
joining means for connecting said inner reel hub means to a driving means for rotating said inner reel hub means on said bearing means and said center shaft means includes means for connecting said shaft means to a driving means for rotating said shaft means and said outer reel hub means.

9. A dual reel hub as set forth in claim 1 wherein said actuating means includes a control pin selectively positionable to engage said outer hub means, said reel support means and said second locking means to effect concurrent rotation thereof.

10. A dual reel hub as set forth in claim 1 and further including ring spacing means located between a locking ring means and a respective one of said inner and outer hub means, said ring spacing means being positionable by a rotation of a corresponding one of said locking ring means between a first position wherein said ring spacing means opposes a respective one of said first and second spring means and a second position wherein said ring spacing means is dominated by a respective one of said first and second spring means.

11. A dual reel hub as set forth in claim 7 wherein said first and second spring means each include three springs extending between a corresponding one of said first and second locking ring means and said first and second reel hub means.

12. A dual reel hub as set forth in claim 10 wherein ring spacing means each includes a plurality of tiltable spacing pins having said first position parallel to an axis of said center shaft and said second position skewed with respect to said center shaft axis.

* * * * *